United States Patent [19]
Belser et al.

[11] Patent Number: 6,002,541
[45] Date of Patent: Dec. 14, 1999

[54] METHOD AND APPARATUS FOR PROVIDING A LINEAR POSITION ERROR SENSING (PES) SIGNAL

[75] Inventors: Karl Arnold Belser; Ju-Hi Hong; Satoshi Yamamoto, all of San Jose, Calif.

[73] Assignee: International Business Machines Corporation, Armonk, N.Y.

[21] Appl. No.: 08/884,828

[22] Filed: Jun. 30, 1997

[51] Int. Cl.$^6$ .................................................. G11B 5/596
[52] U.S. Cl. .................................... 360/77.08; 360/77.02
[58] Field of Search ............................ 360/77.08, 77.05, 360/77.02

[56] References Cited

U.S. PATENT DOCUMENTS

| | | | |
|---|---|---|---|
| 3,881,184 | 4/1975 | Koepcke et al. | 360/78 |
| 4,589,037 | 5/1986 | Jen et al. | 360/77 |
| 4,608,618 | 8/1986 | Sturtevant-Stuart | 360/135 |
| 4,669,004 | 5/1987 | Moon et al. | 360/77 |
| 5,040,084 | 8/1991 | Liu | 360/77.04 |
| 5,245,487 | 9/1993 | Cunningham | 360/77.01 |
| 5,381,281 | 1/1995 | Shrinkle et al. | 360/77.08 |
| 5,479,696 | 1/1996 | McNeil | 29/603 |
| 5,781,361 | 7/1998 | Le et al. | 360/77.08 |
| 5,825,579 | 10/1998 | Cheung et al. | 360/77.08 |
| 5,867,341 | 2/1999 | Volz et al. | 360/77.08 |

Primary Examiner—Andrew L. Sniezek
Assistant Examiner—Dan I. Davidson
Attorney, Agent, or Firm—Gray Cary Ware Freidenrich

[57] ABSTRACT

In accordance with the present invention a storage device servo control system that positions a head relative to multiple tracks of a storage medium includes a servo signal filter that receives a readback signal from the head and produces filtered servo signal data samples, a servo demodulator that receives the filtered readback servo signal from the servo signal filter and produces a position error signal that indicates the head position relative to a track using a demodulation scheme selected in accordance with a track width profile of the storage device, and includes a servo controller that determines the demodulation scheme to be used by the servo demodulator and that processes the position error signal to maintain the head centered relative to the track.

25 Claims, 8 Drawing Sheets

METHOD AND APPARATUS FOR PROVIDING A LINEAR POSITION ERROR SENSING (PES) SIGNAL

BACKGROUND OF THE INVENTION

1. Field of the Invention

This invention relates generally to storage device servo control systems and, more particularly, to disk drive position control systems that determine the location of a head relative to disk tracks.

2. Description of the Related Art

In a conventional computer data storage system having a rotating storage medium, such as a magnetic or magneto-optical disk, data is stored in concentric or spiral tracks across the surface of the disk. Consumers are demanding disk storage systems with increasing capacity, generally at a rate of 60% greater capacity each year. The most expedient way of providing greater disk capacities has been to increase track density in the disk radial direction, meaning data is stored in increasingly narrow tracks. Greater data density in the radial direction is easier to achieve than increasing data density in the circumferential direction, longitudinally within the tracks. Thus, greater data density is achieved by decreasilg the track pitch to provide more tracks from a same-sized disk. With increasing disk capacity, it is becoming more and more difficult to economically maintain the manufacturing tolerances of read head width and write head width to keep pace with the increasingly smaller track pitch.

The data stored on a disk is represented as a series of variations in magnetic orientation of the disk magnetic material. The variations in magnetic orientation, generally comprisinig reversals of magnetic flux, represent binary digits of ones and zeroes that in turn represent information. The binary digits must be read from and recorded onto the disk surface. A transducer such as a combined read/write head is provided to produce and detect the variations in magnetic orientation of the magnetic material as the disk rotates relative to the head. Conventionally, the read/write head is mounted on a disk arm that is moved across the disk by a servo.

A disk drive servo control system controls movement of the disk arm across the surface of the disk to move the read/write head from data track to data track and, once over a selected track, to maintain the head in a track-following path over the centerline of the selected track. Maintaining the head centered over a track facilitates accurate reading and recording of data in the track. Positioning read/write heads is one of the most critical aspects of recording and retrieving data in disk storage systems. With the very high track density of current disk drives, even the smallest head positioning elTor can potentially cause a loss of data. Accordingly, a great deal of effort is devoted to the design of servo control systems.

A servo control system generally centers a read/write head over a track by reading servo information recorded onto the disk surface. The servo information comprises a position-encoded servo pattern of high frequency magnetic flux transitions, generally flux reversals, that are pre-recorded in data fields reserved for disk servo information. The servo pattern typically comprises bursts of flux transitions formed as parallel stripes in the servo tracks, oriented in the radial direction. When the read/write head passes over the servo pattern flux transitions, the head generates an analog readable signal whose repeating cyclic variations can be demodulated and decoded to indicate the position of the head relative to the track from which the pattern was read. The demodulated servo signal is referred to as a position error sensing (PES) signal.

In a sector servo method for providing servo track information to a disk servo control system, each track of the disk surface includes a sector of servo information interspersed between binary data fields. That is, the tracks on a sector servo disk surface are divided into sectors having a short servo track information area followed by a customer data area. The servo information area typically contains a sector marker track identification data and then one or more servo pattern bursts. The sector marker indicates the beginning of a servo sector to the data detection electronics so the data detection electronics will realize that servo information immediately follows in the track. The servo read head can be the same read head used for reading customer data or can be a separate, dedicated servo head. The PLS signal is used to generate a corrective input signal that is applied to the read/write head positioning servo.

The servo pattern is generally recorded such that a quadrature readback signal is generated. More particularly the servo pattern comprises bursts grouped into A, B, C and D bursts that are offset from each other and repeated at regular intervals in the disk tracks. The servo pattern is demodulated so as to generate two cyclic readback signal components a primary signal component called "P" and a quadrature signal component called "Q", each 90° out of phase with the other. With respect to the readback signal generated when the read head is over the A, B, C or D servo bursts, the primary P signal component is formed from the relationship P=B−A and the quadrature Q signal component is formed from the relationship Q=D−C. The PES signal is generated by alternating between the P and Q components according to which one is more linear to provide a PENS signal with the greatest linearity.

As noted above, consumers are demanding greater disk storage capacities. which are being provided by greater track densities. One aid to achieving greater track densities is the magneto-resistive (M-R) head. The M-R head can generally be made more narrow than the conventional inductive head and therefore permits a "write wide/read narrow" track writing method that is conducive to achieving greater track densities. Unfortunately the relatively narrow M-R head has operating characteristics that produce a PES signal that has poor linearity which can lead to poor servo performance. A non-linear PES signal means that the amplitude of the PES signal does not vary linearly as the M-R head is moved from one edge of a track to the other edge of the track. This makes it more difficult to assess head location based on the PES signal. In addition the physical configuration of the M-R head can include a static offset error between the read and write heads.

The poor linearity of the M-R head signal has been somewhat overcome by recording the servo pattern at a reduced track pitch, typically performing servowriting at a ⅓ or ¼ track pitch. That is. a single track of the servo pattern is written in increments of ⅓ or ¼ pitch. This has the effect of increasing the read head width relative to the servo track and increases the linearity of the PES signal. Servowriting at a reduced track pitch also increases the time spent performing the servowriting, which increases manufacturing costs. In addition, alternating between the primary P and quadrature Q components of the readback signal for linearity must occur more frequently. This process is called stitching and can generate signal noise that leads to inaccuracies. The PES stitching also can increase track misregistration (TMR) error which is the error that occurs when the head position otherwise indicated by the PES is offset from the true position of the head relative to the track.

Attempts have been made to provide a more linear PES signal. For example, it has been found that a more linear PES can be provided from high track density disks if an alternative to the P and Q definitions above are used. In particular, rather than use P=B−A and Q=D−C to form the PES signal, a more linear signal can be provided for high track densities by demodulating the servo signal using a difference of sums calculation involving A, B, C, and D, such as primary and quadrature definitions specified by P=(A+B)−(C+D) and Q=(C+D)−(A+B). See, for example, U.S. Pat. No. 5,381,281 to Shrinikle et at.

In the interest of controlling PES signal phase alignment, which can become a problem as the linear density of the PES pattern increases, various seamless servo patterns have been proposed. Such seamless servo patterns are written in one pass at a time without erasure. using a single M-R read/write head, and improve the linearity of the PES signal. More particularly, as the track density increases, the servo pattern frequency must increase to keep the frequency of the servo burst in the highest sensitivity frequency band of the servo processing channel. The increased servo pattern frequency makes phase alignment of the servo pattern bursts during servowriting more difficult. A seamless pattern is easier to record because no phase alignment between adjacent pattern component burst stripes is necessary. Thus, seamless patterns are often used with high track density disks.

Unfortunately because the width of a seamless servo pattern is determined solely by the width of the servowriting head, the width of a seamless servo pattern has a variation equal to the servowrite head width variation. For heads to be used in very high track density applications the tolerances in the read and write head widths are sufficiently variable that it is difficult to select an appropriate PES signal demodulation equation that is optimal for all heads.

Thus, the quadrature P and Q signal components provide a satisfactory PES signal for many applications. In the case of high frequency servo patterns used with high track densities, a difference of sums demodulation scheme has been found to be useful but M-R head manufacturing tolerances make it difficult to know which is better for a given head.

From the discussion above, it should be apparent that there is a need for a disk drive with servo demodulation that can account for differences in track densities and head widths to provide optimal servo demodulation for the track density and head width of the particular disk drive. The present invention satisfies this need.

SUMMARY OF THE INVENTION

In accordance with the present invention, a storage device servo control system that positions a head relative to multiple tracks of a storage medium includes a servo signal filter that receives a readback signal from the head and produces filtered servo signal data samples, a servo demodulator that receives the filtered readback servo signal from the servo signal filter and produces a position error signal that indicates the head position relative to a track using a demodulation scheme selected in accordance with a track width profile of the storage device, and includes a servo controller that determines the demodulation scheme to be used by the servo demodulator and that processes the position error signal to maintain the head centered relative to the track. In this way, the servo control system can select a demodulation scheme that is particularly suited to the track width profile of the particular head and track width format recorded on the storage medium.

In one aspect of the invention, the servo controller can determine the track width profile, and therefore determine the demodulation scheme by measuring the head sensitivity. This can be done during the storage device production process any time after a particular head has been identified for a particular storage device. If desired, the demodulation scheme can be selected after the servo pattern has been recorded on the disk by the servowrite head.

Other features and advantages of the present invention should be apparent from the following description of the preferred embodiment, which illustrates, by way of example, the principles of the invention.

DESCRIPTION OF THE PREFERRED EMBODIMENT

Figure 1:
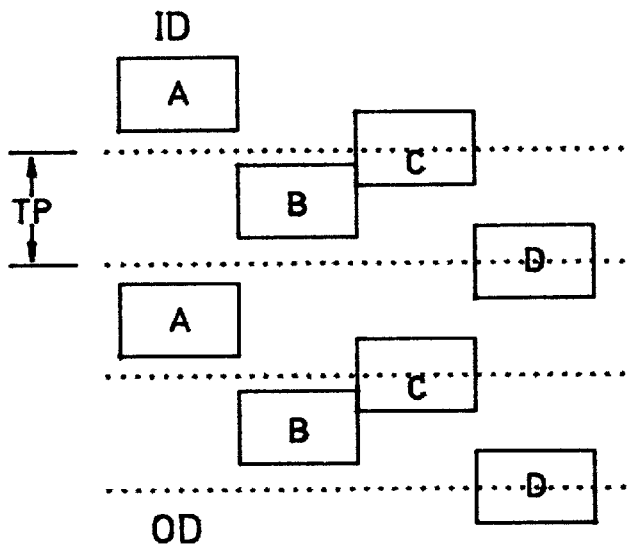
FIG. 1 is a representation of a quad-burst servo pattern recorded in accordance with the present invention, in a vertical orientation on a disk storage medium relative to a first track width profile.
Figure 2:
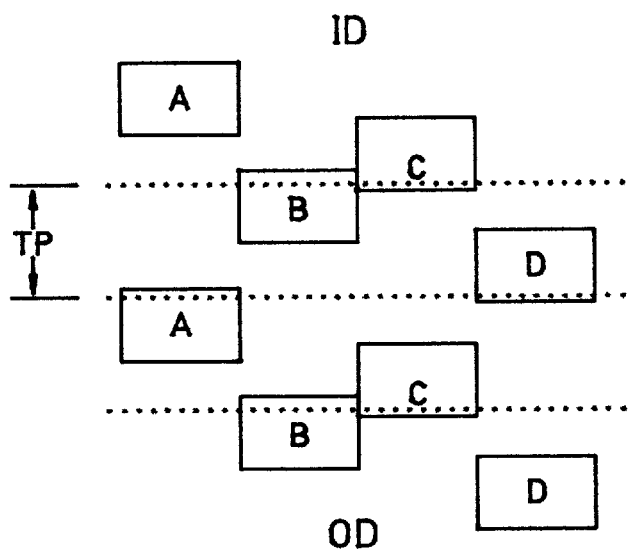
FIG. 2 is a representation of a quad-burst servo pattern recorded in accordance with the present invention, in a vertical orientation on a disk storage medium. relative to a second track width profile.

FIG. 1 and FIG. 2 are representations of a quad-burst servo pattern recorded in tracks of a storage disk such that the tracks extend horizontally across the drawing sheet. A transducing read/write head (not illustrated) detects the servo pattern and generates a readback signal as the disk rotates. In FIG. 1 and FIG. 2, disk rotation may be represented by horizontal movement of the drawing sheet. As the head follows disk tracks it is moved across the storage disk, fiom either the disk inside diameter (ID) or the disk outside diameter (OD) toward the other, and generates a head readback signal that is demodulated to produce a position error sensing (PES) signal. The PES signal is demodulated using either a first demodulation scheme called PES-(1) with P and Q as indicated in FIG. 1 or a second demodulation scheme called PES-(2) with P and Q as indicated in FIG. 2. In accordance with the present invention, a disk drive selects between PES-(1) and PES-(2) depending on the track width profile associated with the read/write head and storage disk combination on which a data access operation will be executed.

In FIG. 1 and FIG. 2, the servo pattern is represented as a quad-burst pattern that includes A, B, C, and D bursts repeated across the disk. Only two sets of bursts are shown in the drawings, for simplicity of illustration. It is to be understood that the pattern is repeated in the disk tracks. The track pitch at which the servo bursts are recorded is indicated by "TP" in FIG. 1 and FIG. 2. The servo pattern centers, given the respective demodulation schemes, are indicated by the dotted lines. In particular, the FIG. 1 demodulation scheme PES-(1) demodulates the head readback signal into PES signal components comprising primary P components and quadrature Q components defined by the equations in Table 1 below.

TABLE 1

| PES-(1) |
|---|
| P = B − A |
| Q = D − C |

Similarly, the FIG. 2 demodulation scheme PES-(2) demodulates the readback signal into PES signal components comprising primary P components and quadrature Q components defined by the equations in Table 2.

TABLE 2

| PES-(2) |
|---|
| P = (B + D) − (A + C) |
| Q = (A + D) − (B + C) |

At the respective servo pattern centers, indicated by the dotted lines, the primary PES signal component P is zero. Preferably, the quad servo pattern bursts are recorded at a one-half data track pitch step using unseamed bursts. Thus, each servo pattern burst has a width of approximately one-half track. For unseamed bursts it should be noted that the servo pattern burst width is approximately equal to the write head width, which is not as wide as the track pitch TP.

The read and write elements and the disk track width define a track width profile that may be characterized as either wide or narrow. The first demodulation scheme, PES-(1). is optimal for head/track pitch combinations having a wide track width profile, while the second demodulation scheme. PES-(2), is optimal for head/track pitch combinations having a narrow track width profile. The demodulation scheme PES-(1) is a conventional quad-burst demodulation scheme. Relative performance of the two demodulation schemes is described in greater detail below. The demodulation scheme PES-(2) is not as widely used as PES-(1) but is especially suited to narrow track pitches (and narrow track width profiles).

Disk Drive System

Figure 3:
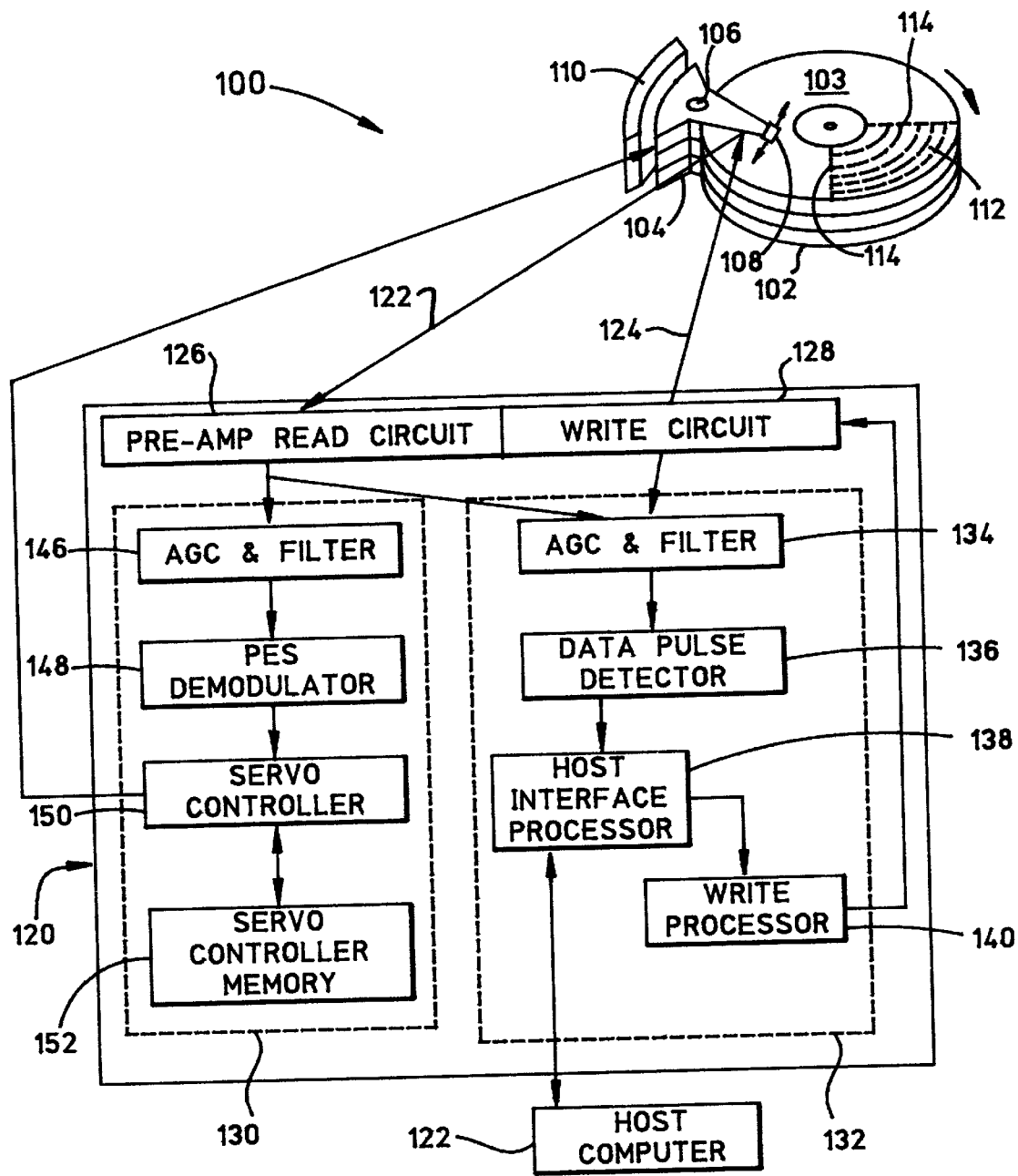
FIG. 3 is a representation of a hard disk drive system constructed in accordance with the present invention.

FIG. 3 is a representation of a direct access storage device (DASD), such as a disk drive system 100, that is constructed in accordance with the present invention. The disk drive 100 includes storage media that may comprise one or more individual disks 102 each having a surface 103 on which is deposited a magnetic recording material for storing magnetically encoded information. The disk drive 100 also includes a plurality of actuator arms 104 that rotate in unison on an actuator shaft 106, one arm for each disk recording surface. At the end of each arm 104 is a magnetic transducer comprising a magneto-resistive (M-R) read/write head 108. Those skilled in the art will understand that an M-R head typically includes a separate read element and write element, the write element being an inductive unit and the read head being an M-R unit.

The position of the actuator arms 104 is controlled by a servo actuator 110, which pivots the arms and thereby changes the position of the read/write elements 108 with respect to concentric tracks 112 of data contained on the disks 102. The disk recording surface 103 is shown divided into sectors, one of which is indicated by dashed lines 114 in the disk radial direction. Although rotary movement of the actuator arms 104 is depicted for illustrative purposes, the disk drive 100 may alternatively use another positioning scheme such as linear extension/retraction of an actuator positioned along a radial direction.

The operation of the disk drive 100 is managed by a disk drive controller 120 which also serves as an interface between the disk drive 100 and a host computer 122. The host computer may comprise, for example, a desktop computer, a notebook computer, a mainframe computer, or other digital data processing device for which direct access to stored data is desired. The disk drive controller 120 receives electrical representations of the servo burst patterns transduced by the read/write heads 108 from the disk 102 over read lines 122 and sends data to the heads for recording on the disk 102 over write lines 124. The disk drive controller 120 and disk drive 100 may be contained within a single housing or may comprise separate, discrete units.

The disk drive controller 120 includes a readback signal pre-amplifier read circuit 126 ("pre-amp"), which receives the readback signal generated by the read/write heads 108 as they transduce the servo pattern. A write circuit 128 supplies the read/write heads 108 with data signals to be written to the disk. With sector servo positioning, the pre-amp 126 preferably serves a dual purpose by amplifying either data or servo signals, depending on whether a read/write head 108 is positioned over stored customer data or servo patterns, respectively.

Thus, the amplified signal from the pre-amp 126 is directed to one of two processing channels: a servo channel 130 or a data channel 132. The servo channel 130 generally functions to read servo data from the disk 102 to aid in properly positioning the read/write heads 108. The data channel 132 generally executes write and read data access operations to and from the disk 102 in response to requests from the host computer 122 to write or read data.

With respect to reading customer data from the disk 102 as part of the data channel 132 operation, the pre-amp 126 amplifies signals provided by the read/write head 108 that correspond to data stored on the disk. Amplified data signals from the pre-amp 126 are then directed to an automatic gain control (AGC) and filter circuit 134 within the data channel 132. A data pulse detector 136 forms digital data pulses corresponding to the analog signals provided by the AGC and filter circuit 134. Next, a host interface processor 138 converts the data pulses into formatted data strings that are specifically compatible with the host computer 122. The host computer can then receive the read customer data. To write data from the host computer 122 to the disk 102, the host computer provides data to the host interface processor 138, which in turn delivers the data to a write processor 140 for formatting. The write processor delivers the formatted data to the write circuit 128, which sends the data to the read/ write heads 108 over the write lines 124 for writing to the disk 102.

In contrast to the data channel 132, the servo channel 130 reads servo data from the disk 102 for positioning the read/write heads 108. When operating in conjunction with the servo channel 130, the pre-amp 126 amplifies servo signals produced when one of the read/write heads 108 senses the servo patterns. FIG. 3 shows that the servo channel 130 includes an automatic gain control (AGC) and filter circuit 146 which receives the readback signal and may comprise any one of various known circuits tor automatically adjusting and filtering the readback signal gain. A PES demodulator 148 then receives the readback signal and processes (that is, demodulates) the information to derive a position error sensing (PES) signal, which is related to the position of the corresponding read/write head 108 with respect to the desired track center and is indicative of the read/write head position error. The PES signal is then used by a servo controller 150 to generate a position signal that, when provided to the disk drive actuator 110, controls the position of the read/write heads 108. The servo actuator may, in an exemplary embodiment, comprise a voice coil motor.

Figure 6:
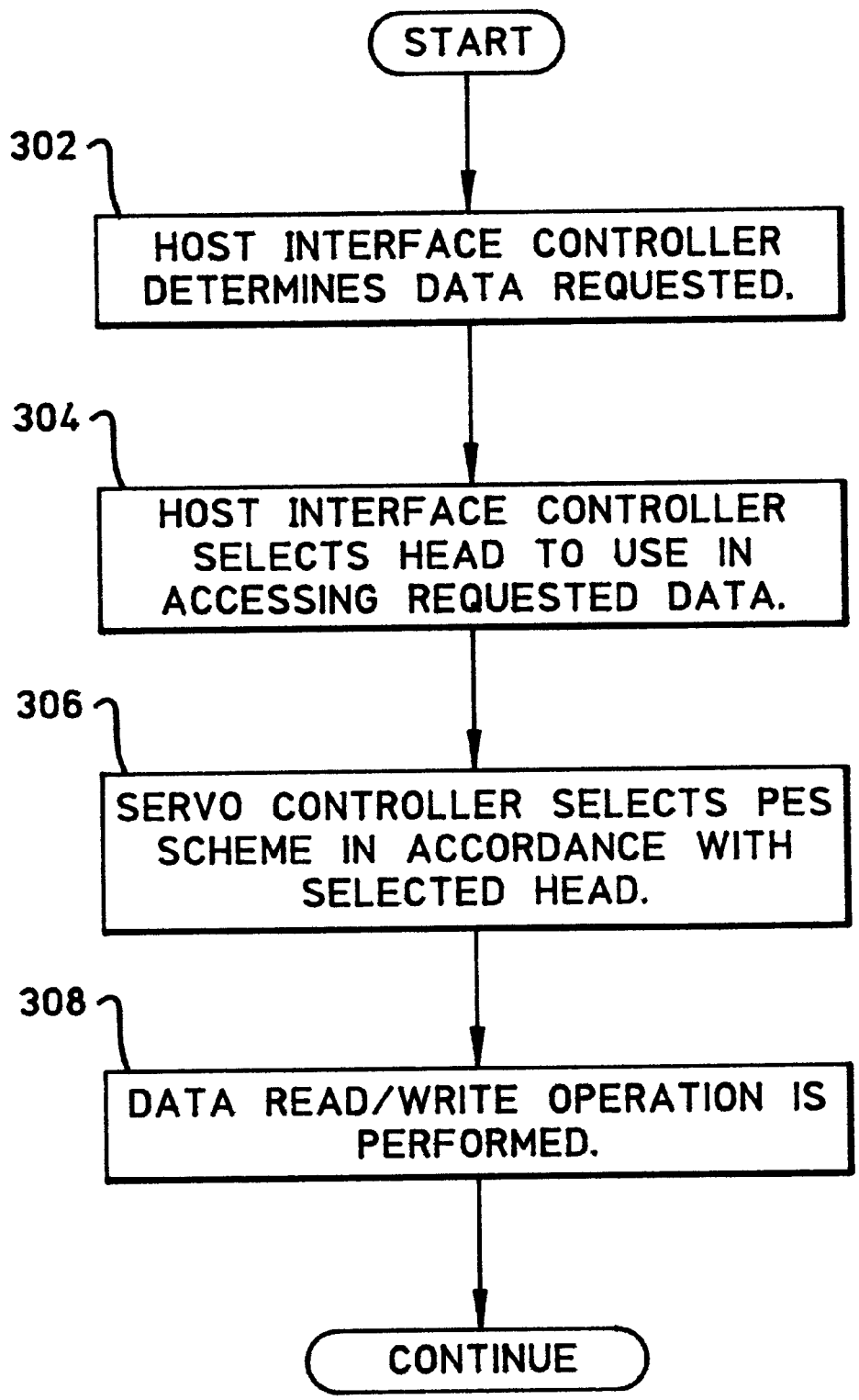
FIG. 6 is a flow diagram that represents the steps performed in servo control of the system illustrated in FIG. 3.

The servo pattern is recorded into, and read from, tracks across the disk 102. In FIG. 6, circular, concentric lines 112 designate servo tracks of the disk, which is divided into sectors that are represented by radial lines 114. Each servo sector includes a servo information field followed by one or more customer sectors including a customer data identification field and a customer data field. The customer area may also include partial sectors in addition to full data sectors, as used in banded recording. After the servo pattern has been recorded and disk production is complete, a user can record and read the user's customer data from the customer data field using for example, the system illustrated in FIG. 6.

It should be noted that additional portions of the servo channel 130 and data channel 132 of the controller 120 in FIG. 3 may be combined. This is even more practical with the single-pass writing of the servo bursts in accordance with the preferred embodimnent. Thus, for example, sharing a single AGC and filter between the two channels may be practical.

Disk Drive Assembly

Figure 4:
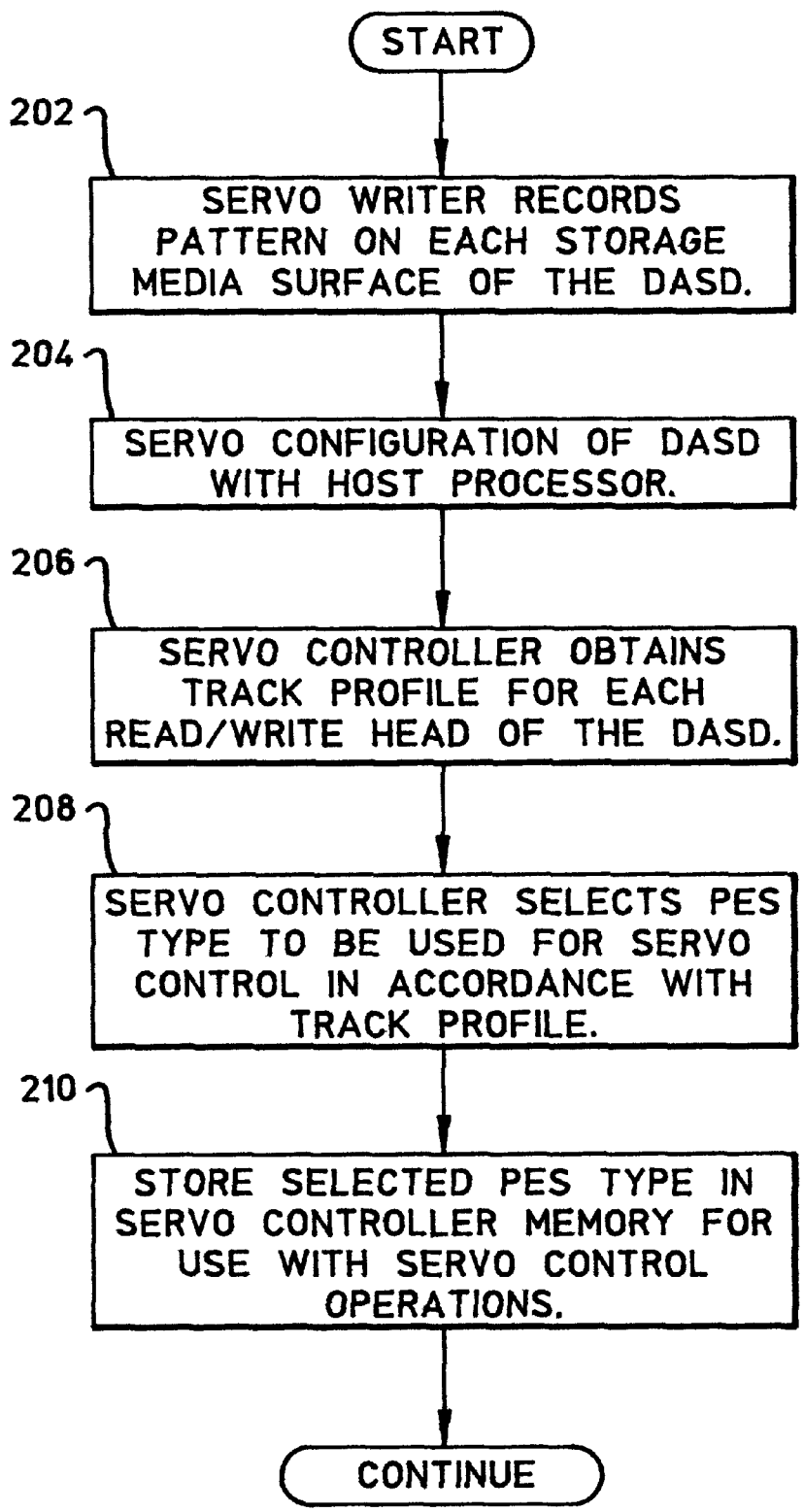
FIG. 4 is a flow diagram that represents the steps performed in a hard disk drive assembly process for the system illustrated in FIG. 3.

FIG. 4 illustrates the steps followed in producing a disk drive assembly in accordance with the present invention. In the first step of the process, represented by the flow diagram box numbered 202, a servo writer records the servo pattern on each storage media surface of the disk drive assembly, which is also referred to as a direct access storage device (DASD). The servo writer can comprise a dedicated system that records servo pattern bursts on the recording surfaces of storage media before the disks are assembled into the disk drive. In the preferred embodiment, however, the disks are assembled into the DASD housing with the actuator arms and read/write heads before the servo patterns are recorded. In this way, the read/write heads that will be used for executing access operations on customer data are the same read/write heads used for recording the servo pattern. The step 202 of servowriting may be better understood with reference to FIG. 5.

Figure 5:
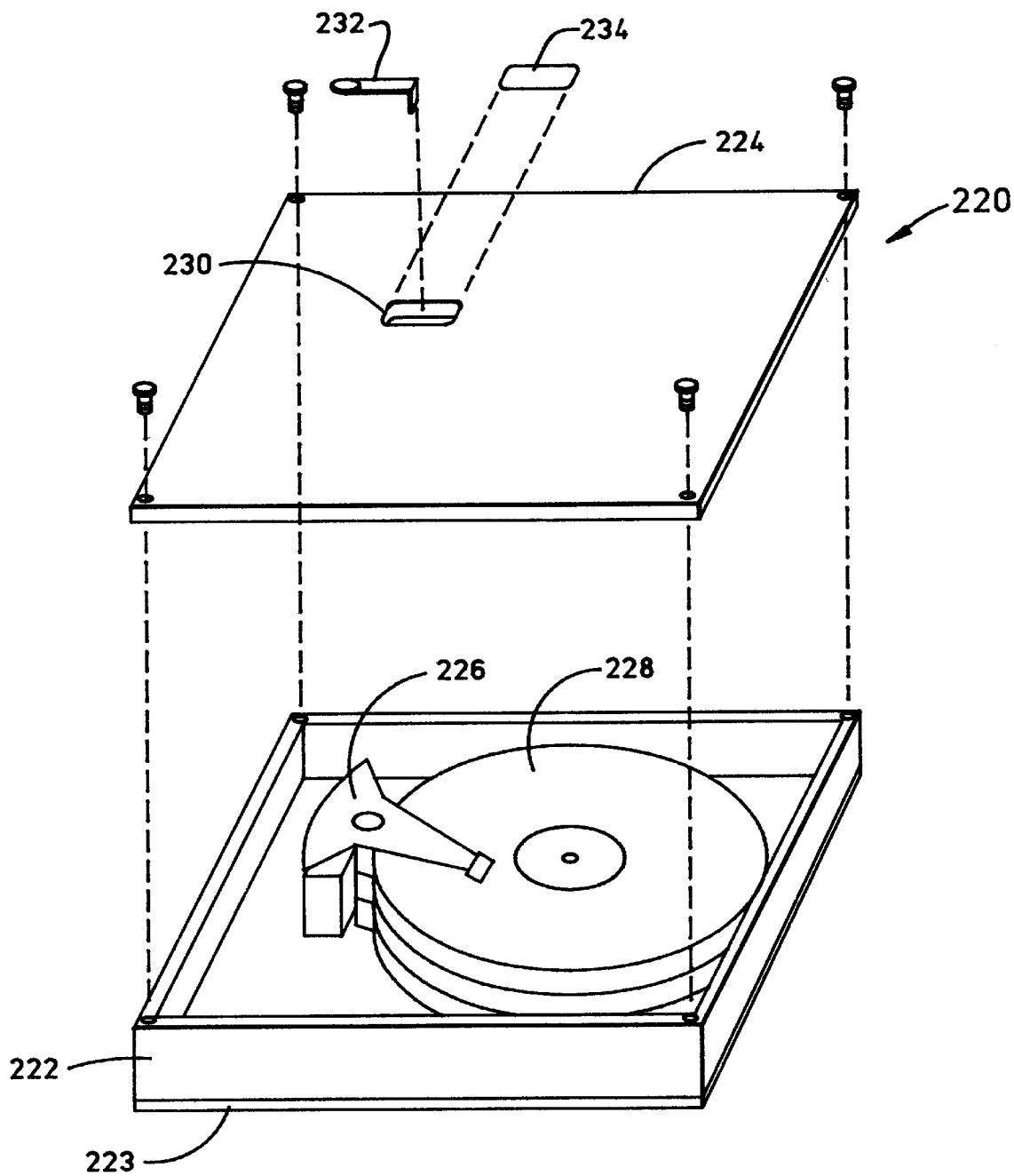
FIG. 5 is a representation of a disk drive constructed in accordance with the present invention illustrating the servo writing process with the disk drive components of FIG. 3.

FIG. 5 is a representation of a DASD 220 having a housing/circuit board carrier 299 with a cover plate 224. The DASD 220 includes an actuator arm assembly 226 and a rotatable storage media comprising multiple disk platters 228, similar to the disk drive illustrated in FIG. 3. The cover plate 224 includes an access hole 230 through which a mechanical pusher arm 232 is inserted during servo write time. The pusher arm is part of a servowrite machine (not illustrated) and engages the actuator 226 to physically move it across the disk surface in a predetermined manner. The circuits of the servo controller (FIG. 3) cooperate with the pusher arm to record the appropriate servo pattern bursts on the disks. Thus, different heads of the arm assembly 226 will be energized as disk servo writing proceeds.

Servowriting of the DASD 220 as described above is advantageous because the drive components can be fully assembled before electrical connections need be made and communications interfaces arc made operational thereby increasing efficiency of the production line process. After all physical components have been assembled in the housing 222 and the cover plate 224 has been attached the pusher arm 232 provides servo writing signals to the servo controller (FIG. 3) as the actuator arm 226 is moved across the disk surfaces. When the servo writing operation is completed, a seal 234 is used to cover the access hole 230, completing assembly of the DASD.

After the servo write operation is completed (FIG. 4 flow diagram box numbered 202), the DASD must be configured with the host computer processor with which it will be communicating. Tie configuration step is represented by the FIG. 4 flow diagramii box numbered 204. The disk drive configuration step involves verifying communication paths and interfaces between the disk drive and the host computer, as will be understood by those skilled in the art. As an alternative to performing the configuration step immediately following servo writing, the configuration may be performed as the last step of the operations in FIG. 4.

In the next processing step, represented by the FIG. 4 flow diagram box numbered 206, the servo controller obtains the track width profile for each read/write head of the disk drive. The track width profile is a parameter that indicates the relative width of the write element and read element. As noted above, the preferred embodiment has a read/write head that includes an inductive write element and a matineto-resistive read element. Therefore, in the preferred embodiment, the track width profile refers to the width of the write clement used to record information in a track as compared with the width of the read element being used to read the information from the track. Due to variations in the production process, it is not unusual for read and write elements of a head to each vary in width by 50%.

Table 3 below lists the maximum PES non-linearity for exemplary read and write element dimensions, and shows typical read element widths in a range from 1.65 $\mu$m to 2.35 $\mu$m and write element widths in a range from 1.90 $\mu$m to 2.70 $\mu$m. The track pitch in this example is 30 $\mu$m. The maximum PES non-linearity is expressed as a percentage of track pitch for the given combination of read and write widths. For purposes of the PES scheme selection using the PES-(1) and PES-(2) schemes described above, the three table entries in the lower right corner of the table (values of 0.53%, 0.40%, and 0.31%) are classed as having a relatively wide track width profile. Thus, these head width combinations provide a more linear PES if the PES-(1) demodulation scheme is used. The other combinations of read and write element widths have a relatively narrow track width profile and will produce a more linear PES if the PES-(2) demodulation scheme is used.

TABLE 3

Max PES Non-Linearity for Read Head Width vs. Write Head Width

| READ WIDTH(μM) | WRITE WIDTH(μM) | | |
|---|---|---|---|
| | 1.90 | 2.30 | 2.70 |
| 1.65 | 2.32% | 1.89% | 1.28% |
| 2.00 | 1.33% | 0.79% | 0.31% |
| 2.35 | 0.65% | 0.53% | 0.40% |

It should be noted that read and write widths, for M-R heads, can be determined by wafer level measurements during the head manufacturing process. Thus, it may be possible to determine the track profile during the manufacturing process before disk assembly and before any track width profile sensitivity measurement.

Returning to the disk drive production process represented by the flow diagram of FIG. 4, after obtaining the track profile for each read/write head combination (step 206), the next step is for the servo controller to select the PES demodulation scheme to be used for servo control. This step is represented by the flow diagram box numbered 208. That is, for the two-type PFS demodulation selection of the preferred embodiment, the servo controller must classify the head combination of the disk drive as being either narrow or wide. If the track width profile is classed as wide, then PES-(1) is used. If the track width profile is classed as narrow, then PES-(2) is used.

In the next processing step, represented by the flow diagram box numbered 210, the servo controller stores the PES demodulating scheme tor each read/write head combination in servo controller memory for later retrieval. Thereafter, whenever the servo controller must perform track following operations requires, servo control, the controller can automatically consult its memory for the determined demodulating schemes and perform appropriate processing. In this way, the servo controller can quickly determine, for example, if primary ("P") readback signal samples will be determined by using P=(A−B) or by using P=(B+D)−(A−C).

Drive Operation After Servo Configuration

FIG. 6 shows the steps executed in performing servo control operations in conjunction with data access operations of the system illustrated in FIG. 3. In the first step, the host interface controller determines the data being requested by the host computer. This step is represented by the FIG. 6 flow diagram box numbered 302. This step includes, for example, the host interface controller determining which disk of a multiple-disk storage system contains a requested data item. Procedures for performing this step are well-known and do not form a part of the invention herein. Next, represented by the box numbered 304, the host interface controller selects a head to use in accessing the requested data. Typically, there is a one-to-one correspondence between the read/write heads and the disk surfaces. This is because it is inefficient to use one head for more than one disk surface. Accordingly, if in step 302 the host interface controller determines that the requested customer data is located on the third disk surface, then in step 304 the read/write head dedicated to the third disk surface will be selected.

In the next processing step, the servo controller selects the PES demodulation scheme in accordance with the track width profile of the selected head. That is, if the selected head has a relatively wide profile (as determined according to the FIG. 4 process), then the controller will indicate to the servo demodulator that the PES-(1) demodulation scheme is to be used. If the selected head has a relatively narrow profile, then the controller will use the PES-(2) demodulation scheme. In the preferred embodiment, the servo controller selects the demodulation scheme by consulting controller memory and retrieving the appropriate parameter, as described in the FIG. 4 process. The servo controller, for example, can provide the demodulator with a flag that indicates either PES-(1) or PES-(2), or the servo controller can provide any other indicator that results in the demodulator using the appropriate PES demodulation scheme.

Lastly, the data access operation is performed while the servo control operation is performed to ensure stable track following. This last step is represented by the FIG. 6 flow diagram box numbered 308. Computer operation then continues.

Empirical Results of Switched PES Demodulation

FIGS. 7 through 12 show PES results obtained for wide track profile and narrow track profile configurations using the PES-(1) and PES-(2) demodulation schemes described above. These graphs show the advantages gained through use of the invention.

Figure 7:
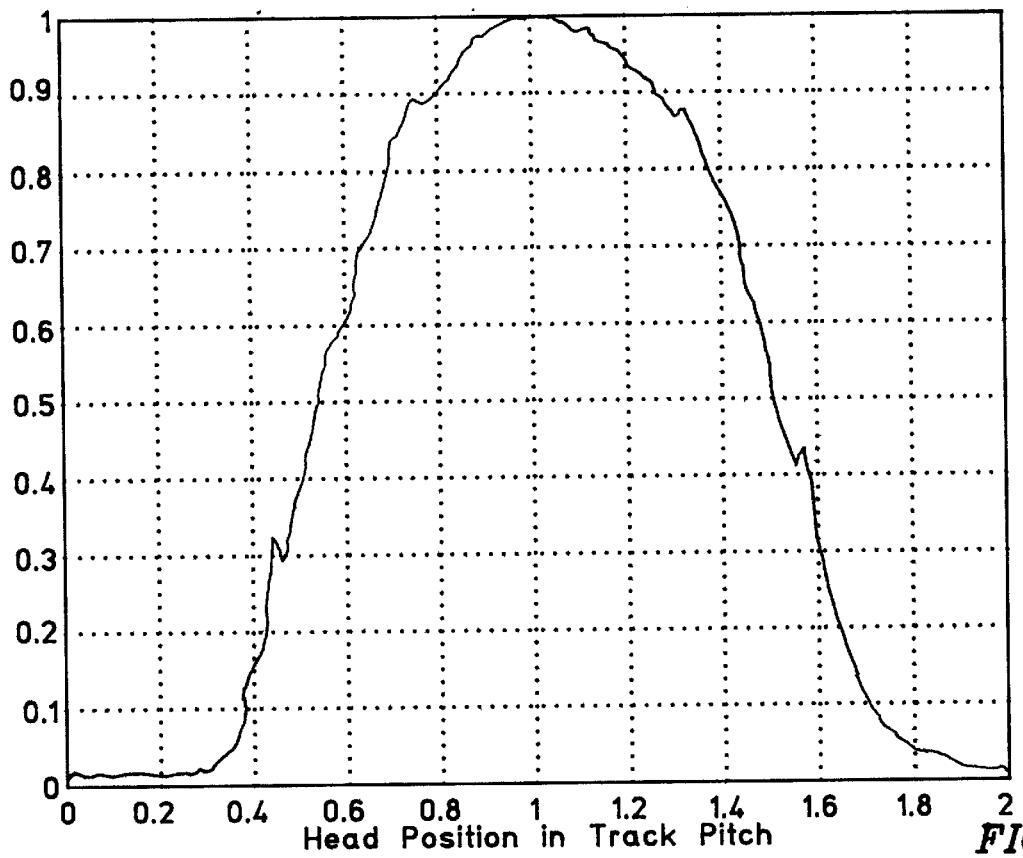
FIG. 7 is a track profile as measured for an exemplary disk having a first relatively wide track profile.
Figure 8:
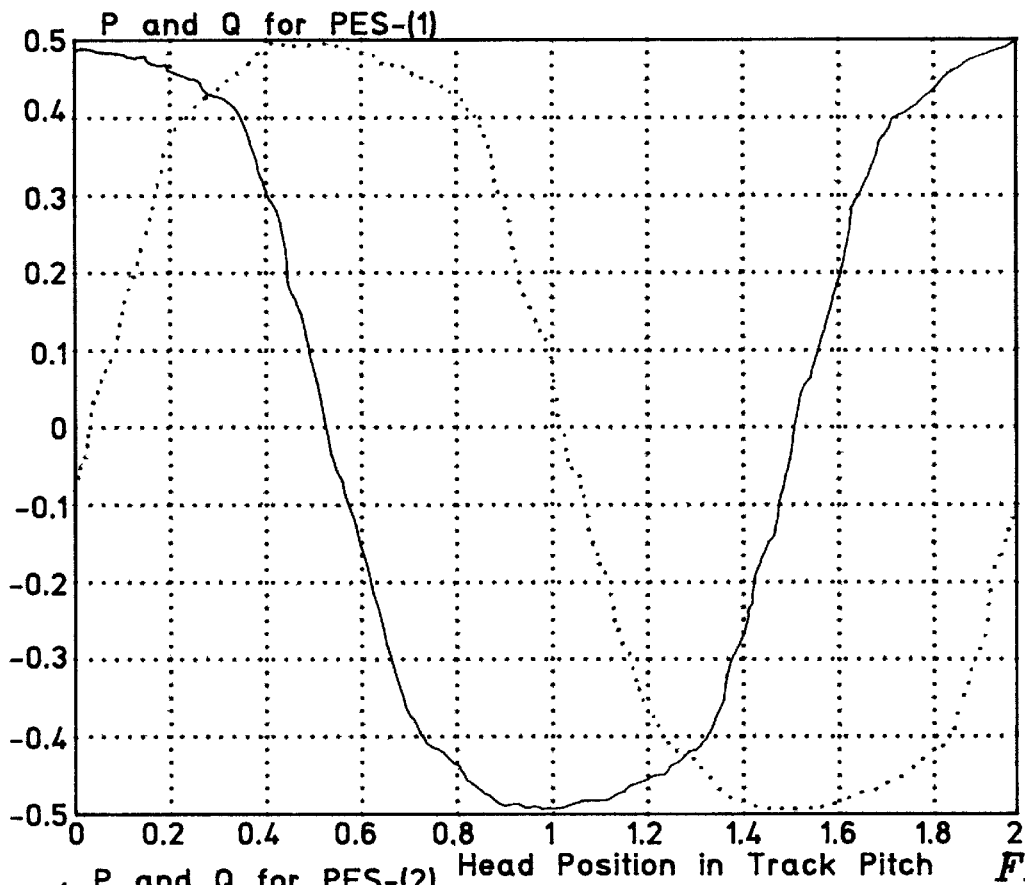
FIG. 8 is a representation of the P signal and Q signal portions of the PES signal "PES-(1)" produced by the demodulator of the system illustrated in FIG. 3 in accordance with the first track width profile.
Figure 9:
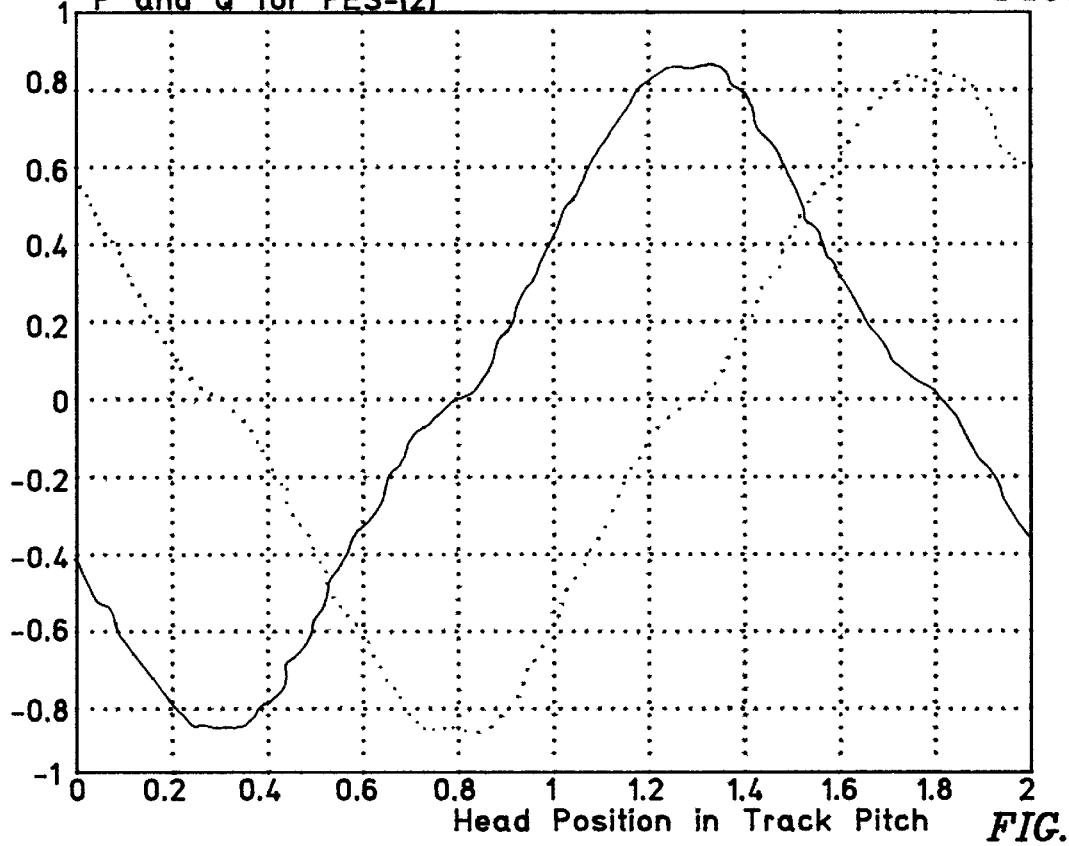
FIG. 9 is a representation of the P signal and Q signal portions of the PES signal "PES-(2)" produced by the demodulator of the system illustrated in FIG. 3 in accordance with the first track width profile.

FIG. 7 shows a measured track profile for a track that is wider than that of a nominal M-R head. FIG. 8 shows PES signal components for the FIG. 7 track profile when the PES-(1) demodulation scheme is used, and FIG. 9 shows PES signal components for the FIG. 7 track profile when the PES-(2) demodulation scheme is used. In each of the FIG. 8 and FIG. 9 graphs, the primary P signal component is shown in a solid line and the quadrature Q signal component is shown in dotted line. It should be apparent that the FIG. 8 graph provides a more linear PES function, in that it is more linear in the relevant range, such as head track position 0.3 to 0.8 for the P signal component and 0.8 to 1.3 for the Q component. In comparison, the FIG. 9 graph shows a non-linearity (inflection point) at approximately 0.8 head position for the P signal component and 1.3 head position for the Q signal component. Thus, the PES-(1) scheme would be selected by the servo controller if presented with a wide track width profile disk.

Figure 10:
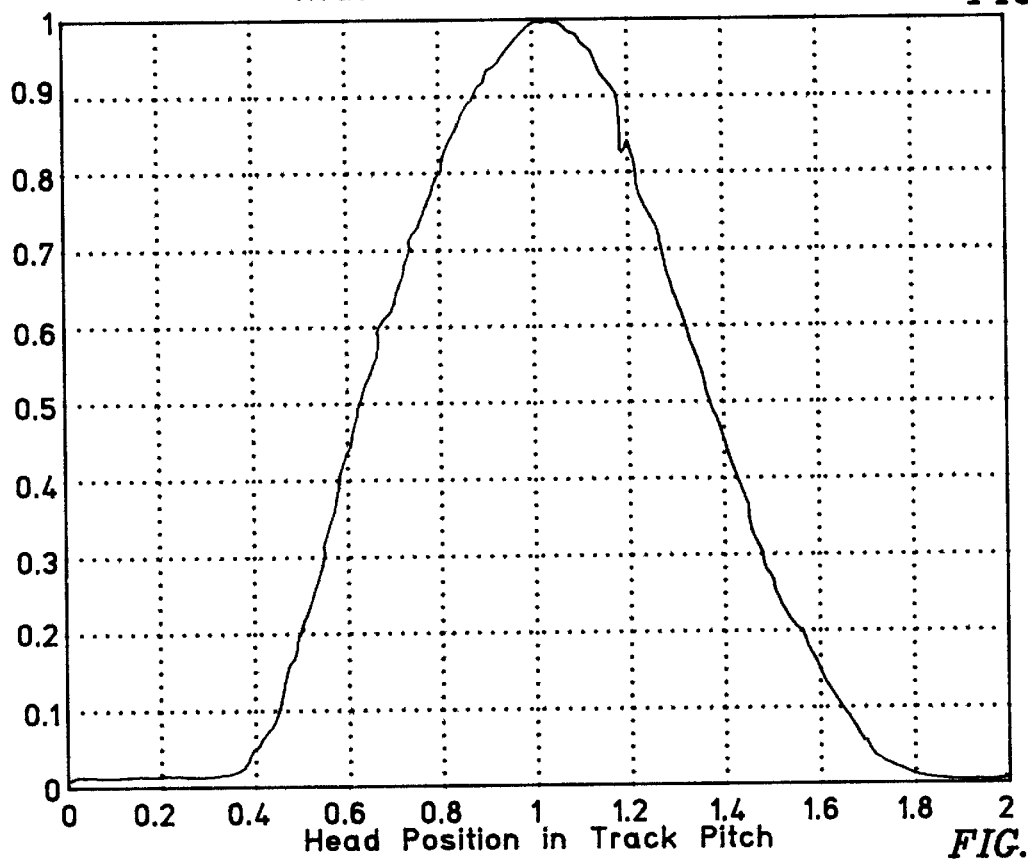
FIG. 10 is a track profile as measured for an exemplary disk having a second relatively narrow track profile.
Figure 11:
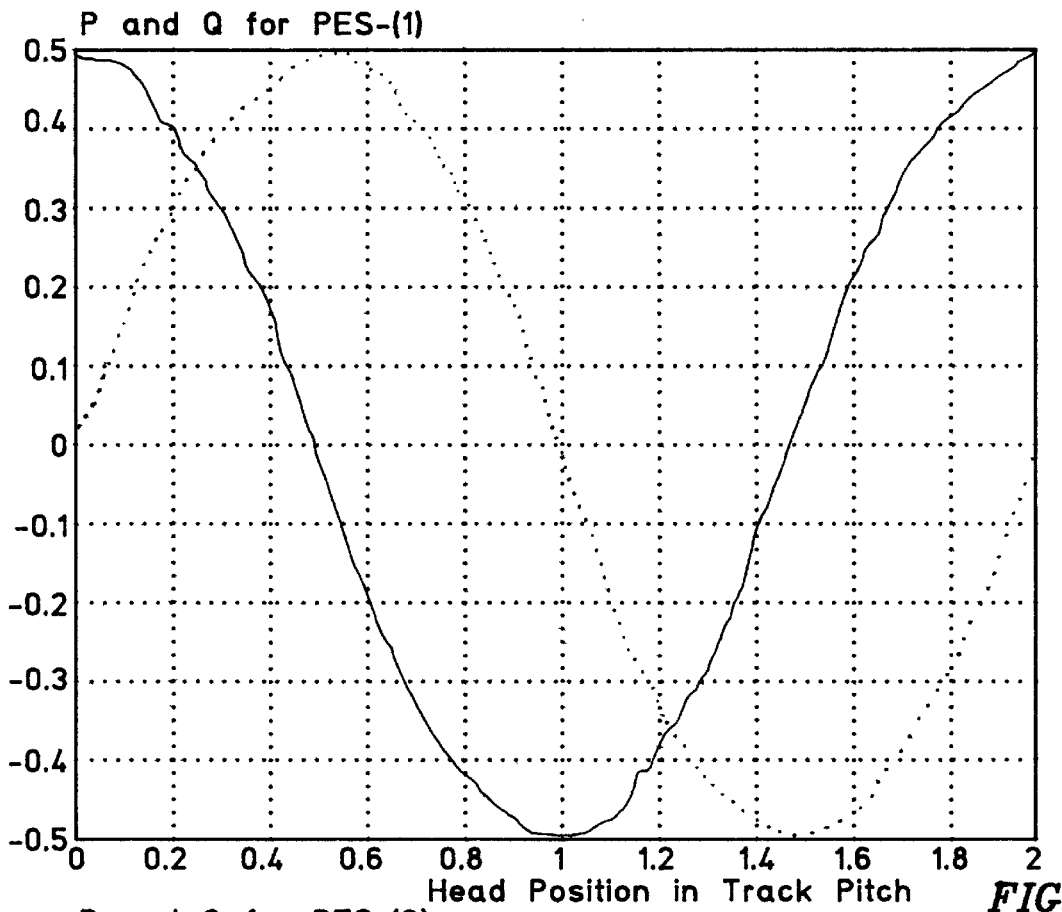
FIG. 11 is a representation of the P signal and Q signal portions of the PES signal "PES-(1)" produced by the demodulator of the system illustrated in FIG. 3 in accordance with the second track width profile.
Figure 12:
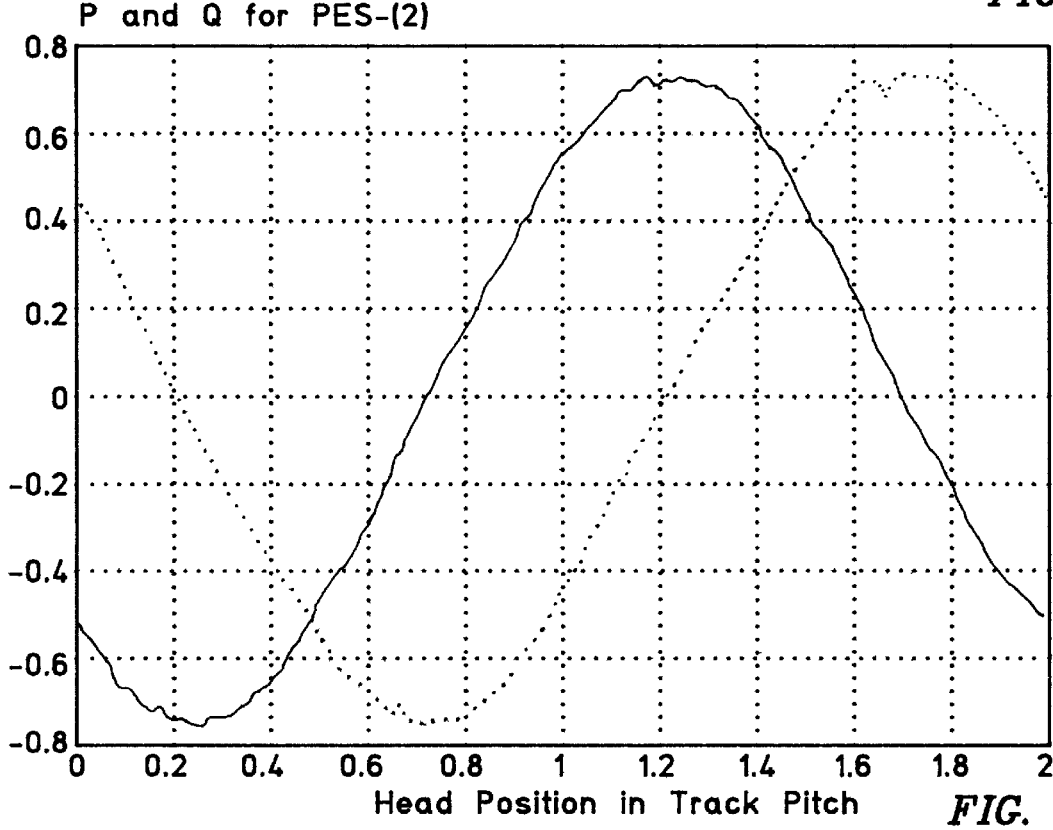
FIG. 12 is a representation of the P signal and Q signal portions of the PES signal "PES-(2)" produced by the demodulator of the system illustrated in FIG. 3 in accordance with the second track width profile.

Conversely, FIG. 10 shows a measured track profile for a track that is slightly more narrow that of a nominal M-R head. FIG. 11 shows the PES signal components for the FIG. 10 track profile when the PES-(1) demodulation scheme is used, and FIG. 12 shows PES signal components for the FIG. 10 track profile when the PES-(2) demodulation scheme is used. In each of the FIG. 11 and FIG. 12 graphs, the primary P signal component is shown in a solid line and the quadrature Q signal component is shown in dotted line. It should be apparent that the FIG. 12 graph provides a more linear PES functions in that it is more linear in the relevant range, so that the PES-(2) demodulation scheme would be selected by the servo controller if presented with a narrow track width profile disk. For example, the FIG. 11 graph includes two non-linearities in relevant areas, at approximately 0.35 head position and again at 0.65 head position for the P signal component. In contrast, FIG. 12 provides a more nearly linear signal through the relevant portion of the graph.

Advantages of the Invention

A storage device constructed in accordance with the present invention includes a servo control system that can select from multiple demodulation schemes so as to choose one that is particularly suited to the track width profile of the particular head and track width format recorded on the storage medium. This provides more accurate servo demodulation and more accurate track following, providing superior performance even as disk track densities continue to increase.

The present invention has been described above in terms of presently preferred embodiments so that an understanding of the present invention can be conveyed. There are, however many configurations for disk storage systems and servo control systems not specifically described herein but with which the present invention is applicable. The present invention should therefore not be seen as limited to the particular embodiments described herein but rather it should be understood that the present invention has wide applicability with respect to disk storage systems and servo control systems generally. All modifications, variations, or equivalent arrangements that are within the scope of the attached claims should therefore be considered to be within the scope of the invention.

We claim:

1. A servo control system for a direct access storage device (DASD) that positions a head of the DASD relative to multiple tracks of a storage medium for executing data access operations on the storage medium the system comprising:
   a servo signal filter that receives a readback signal from the head and produces filtered servo signal data samples;
   a servo demodulator that receives the filtered readback servo signal from the servo signal filter and produces a position error signal that indicates the head position relative to a track using a demodulation scheme selected in accordance with a track width profile of the DASD; and
   a servo controller that determines the demodulation scheme to be used by the servo demodulator and that processes the position error signal to maintain the head centered relative to the track.

2. A servo control system as defined in claim 1, wherein the servo controller determines the track width profile by measuring sensitivity of the head.

3. A servo control system as defined in claim 1, wherein the servo controller determines the demodulation scheme after the servo pattern has been recorded on the storage medium.

4. A servo control system as defined in claim 1, wherein the data access operation is executed on one of a plurality of storage medium surfaces and the servo controller determines a demodulation scheme for each storage medium surface.

5. A servo control system as defined in claim 4, wherein the DASD includes a head for each storage medium surface and the servo controller determines a track width profile associated with each storage medium surface by measuring sensitivity of the respective head.

6. A servo control system as defined in claim 4, wherein the DASD includes a head for each storage medium surface and the servo controller determines the demodulation scheme for each storage medium surface after the servo pattern has been recorded on each respective storage medium surface.

7. A servo control system that positions a head relative to a storage media with at least one recording surface on which is recorded a servo pattern in a plurality of tracks the head generating a head readback signal from transducing the servo pattern, the servo control system comprising:
   a servo signal filter that receives a readback signal from the head and produces filtered servo signal data samples;
   a servo demodulator that receives the filtered readback signal from the servo signal filter and produces a position error signal that indicates the head position relative to a track using a demodulation scheme selected in to accordance with a track width profile of the head;
   a servo assembly that is activated to position the head relative to the storage recording surface; and
   a servo controller that determines the demodulation scheme to be used by the servo demodulator and that controls the servo assembly in accordance with the position error signal to maintain the head centered relative to the track.

8. A servo control system as defined in claim 7, wherein the servo controller determines the track width profile by measuring sensitivity of the head.

9. A servo control system as defined in claim 7, wherein the servo controller determines the demodulation scheme after the servo pattern has been recorded on the storage media.

10. A servo control system as defined in claim 7, wherein the storage media comprises a plurality of storage medium surfaces and the servo controller determines a demodulation scheme for each surface.

11. A servo control system as defined in claim 10, wherein each storage medium surface is provided with a head that transduces a servo pattern recorded thereon, and the servo controller determines a track width profile associated with each storage medium surface by measuring sensitivity of the respective head.

12. A servo control system as defined in claim 11, wherein each storage medium surface is provided with a head that transduces a servo pattern recorded thereon, and the servo controller determines the demodulation scheme for each storage medium surface after the servo pattern has been recorded on each respective storage medium surface.

13. A disk drive having:
   a magnetic storage media on which is recorded a servo pattern comprising a repeating sequence of magnetic transitions extending across the width of tracks;
   a head assembly having at least one read head for reading the servo pattern recorded in the multiple tracks and generating therefrom a head readback signal;
   a servo demodulator that receives the filtered readback signal from the head assembly and produces a position error signal that indicates the head position relative to a track using a demodulation scheme selected in accordance with a track width profile of the head;
   a servo assembly that is activated to position the head relative to the magnetic storage media; and
   a servo controller that determines the demodulation scheme to be used by the servo demodulator and that controls the servo assembly in accordance with the position error signal to maintain the head centered relative to the track.

14. A disk drive as defined in claim 13, wherein the servo controller determines the track width profile by measuring sensitivity of the head.

15. A disk drive as defined in claim 13, wherein the servo controller determines the demodulation scheme after the servo pattern has been recorded on the storage media.

16. A disk drive as defined in claim 13, wherein the storage media comprises a plurality of storage medium surfaces and the servo controller determines a demodulation scheme for each surface.

17. A disk drive as defined in claim 16, wherein each storage medium surface is provided with a head that transduces a servo pattern recorded thereon, and the servo controller determines a track width profile associated with each storage medium surface by measuring sensitivity of the respective head.

18. A disk drive as defined in claim 17, wherein each storage medium surface is provided with a head that transduces a servo pattern recorded thereon, and the servo controller determines the demodulation scheme for each storage medium surface after the servo pattern has been recorded on each respective storage medium surface.

19. A method of producing a data storage system having a storage media with at least one recording surface on which is recorded a servo pattern in a plurality of tracks, at least one head for transducing the servo pattern and generating a head readback signal, and a demodulator that produces a position error sensing signal from the head readback signal to position the head relative to the tracks, the method comprising the steps of:

recording the servo pattern on each recording surface of the storage media;

obtaining a track width profile associated with each recording surface;

storing a plurality of demodulation schemes in memory of the data storage system; and selecting a demodulation scheme in accordance with each track width profile to provide a substantially linear position error sensing signal.

20. A method as defined in claim 19, wherein the step of obtaining a track width profile comprises measuring sensitivity of the head.

21. A method as defined in claim 19, wherein the storage media comprises a plurality of storage medium surfaces and a demodulation scheme is selected for each surface.

22. A method as defined in claim 21, wherein each storage medium surface is provided with a head that transduces a servo pattern recorded thereon, and the step of obtaining a track width profile comprises measuring, sensitivity of a head associated with each respective storage medium surface.

23. A method as defined in claim 22, wherein each storage medium surface is provided with a head that transduces a servo pattern recorded thereon, and the step of selecting a demodulation scheme comprises determining a demodulation scheme to be used for each storage medium surface after the servo pattern has been recorded on each respective storage medium surface.

24. A method of controlling the position of at least one transducing head relative to tracks of a storage media comprising a plurality of storage surfaces, the method comprising the steps of:

determining a storage surface to be accessed with the transducing head for execution of a data operation;

selecting a demodulation scheme in accordance with a track width profile for the storage surface; and maintaining the position of the transducing head relative to a track on the storage surface.

25. A method as defined in claim 24, wherein the step of selecting comprises the steps of:

selecting one of a plurality of transducing heads corresponding to the storage surface; and selecting a demodulation scheme based on both the selected transducing head and a track width profile with which it is associated.

* * * * *